G. W. LEWIN.

Magazine Stove.

No. 97,529.

Patented Dec. 7, 1869.

UNITED STATES PATENT OFFICE.

GEORGE W. LEWIN, OF WORCESTER, MASSACHUSETTS.

BASE-BURNING STOVE.

Specification forming part of Letters Patent No. 97,529, dated December 7, 1869.

*To all whom it may concern:*

Be it known that I, GEORGE W. LEWIN, of the city and county of Worcester, and Commonwealth of Massachusetts, have invented new and useful Improvements in Base-Burning Stoves, of which the following is a full, clear, and exact description, reference being had to the accompanying drawings, forming a part of this specification, in which—

Figure 1:
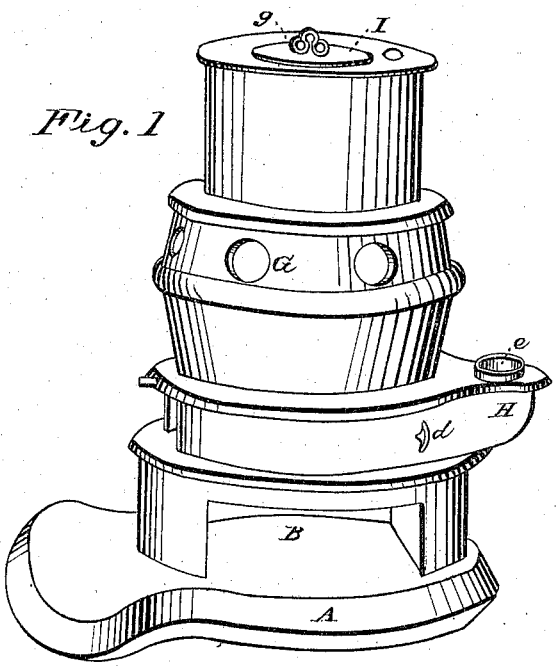
Figure 2:
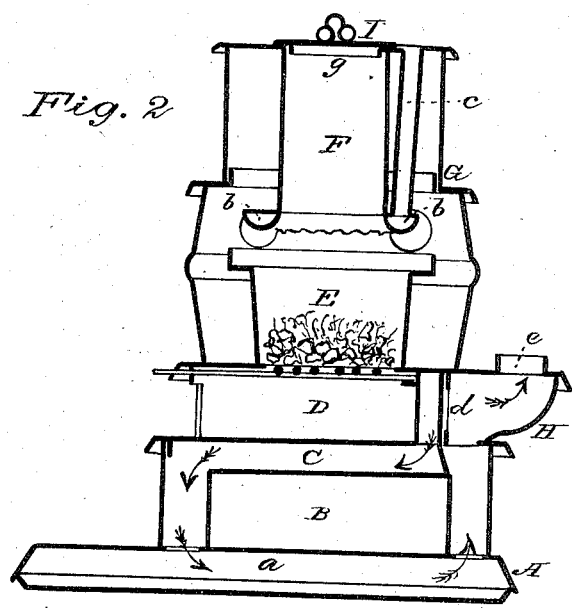

Figure 1 represents a perspective view of so much of a base-burning stove as is necessary to illustrate my present improvements; and Fig. 2 represents a vertical central section thereof.

To enable those skilled in the art to which my invention belongs to make and use the same, I will describe it more in detail.

The nature of my invention consists in the combination of an oven with a base-burning stove, as will be hereinafter explained.

In the drawings, A represents the base of the stove, which is made hollow, as shown at $a$.

Above the base A is an oven, B, the opening to which is to be closed by a door or slide in the ordinary manner.

Above the oven B is a hot-air passage, C, and above that is the ash-pit D.

The fire-pot E is arranged above the ash-pit and below the supply-cylinder F, which is provided at its lower end with a perforated air-chamber, $b$, the air being supplied thereto from the top of the stove by means of a small pipe, $c$.

G is the outer casing to the stove, and through which two smoke-flues may lead to the chimney, one from the upper part of the stove and one from the projection H.

$d$ is a damper, by means of which, when closed, the heated gases are caused to pass around the oven B, as indicated by arrows in Fig. 2. When it is not desired to heat the oven, damper $d$ may be opened, when the heated gases will pass off through the opening $e$ without passing around the oven.

Base-burning stoves have become quite common, and the combination therewith of an oven, as shown and described, is regarded as a very important improvement in such class of stoves.

By the introduction of the perforated air-chamber $b$ the heat of the gases is greatly increased, whereby the proper heat of the oven for baking purposes is insured.

The fuel is supplied through the opening closed by the cover I at the top of the stove.

Having described my improvements in base-burning stoves, what I claim therein as new and of my invention, and desire to secure by Letters Patent, is—

1. The combination, with a base-burning stove, of an oven, B, substantially as and for the purposes set forth.

2. The arrangement of the supply-cylinder F, fire-pot E, ash-pit D, oven B, and hot-air chambers or passages C and $a$, substantially as and for the purposes set forth.

3. The combination and relative arrangement, in a base-burning stove, of a perforated air-chamber, $b$, and oven B, as shown and described.

GEO. W. LEWIN.

Witnesses:
 THOS. H. DODGE,
 GEO. H. MILLER.